United States Patent

[11] 3,583,693

| [72] | Inventor | James R. Johnston<br>Elkhart, Ind. |
|---|---|---|
| [21] | Appl. No. | 764,712 |
| [22] | Filed | Oct. 3, 1968 |
| [45] | Patented | June 8, 1971 |
| [73] | Assignee | Leigh Products, Inc.<br>Cooperville, Mich. |

[54] SHOCK ABSORBER
10 Claims, 6 Drawing Figs.

[52] U.S. Cl. .................................................... 267/153,
267/63
[51] Int. Cl. ....................................................... F16f 9/02
[50] Field of Search ........................................... 267/151,
134, 152, 153, 182, 63, 34

[56] References Cited
UNITED STATES PATENTS
1,759,649  5/1930  Lebherz ........................ 267/34(UX)
2,683,034  7/1954  Seddon ......................... 267/63

*Primary Examiner*—James B. Marbert
*Attorney*—Hobbs and Green

ABSTRACT: A shock absorber device having a tubular member pivoted at one end and a shaftlike member movable in the tubular member and pivoted at the opposite end, and a cushion seated in the pivoted end of the tubular member and being compressed by the end of the shaftlike member when the body controlled by the shock absorber device is moved to a position causing the shaftlike member to seat on the cushion. The cushion is preferable tubular-shaped and constructed of a plastic material such as polyurethane.

PATENTED JUN 8 1971
3,583,693
SHEET 1 OF 2
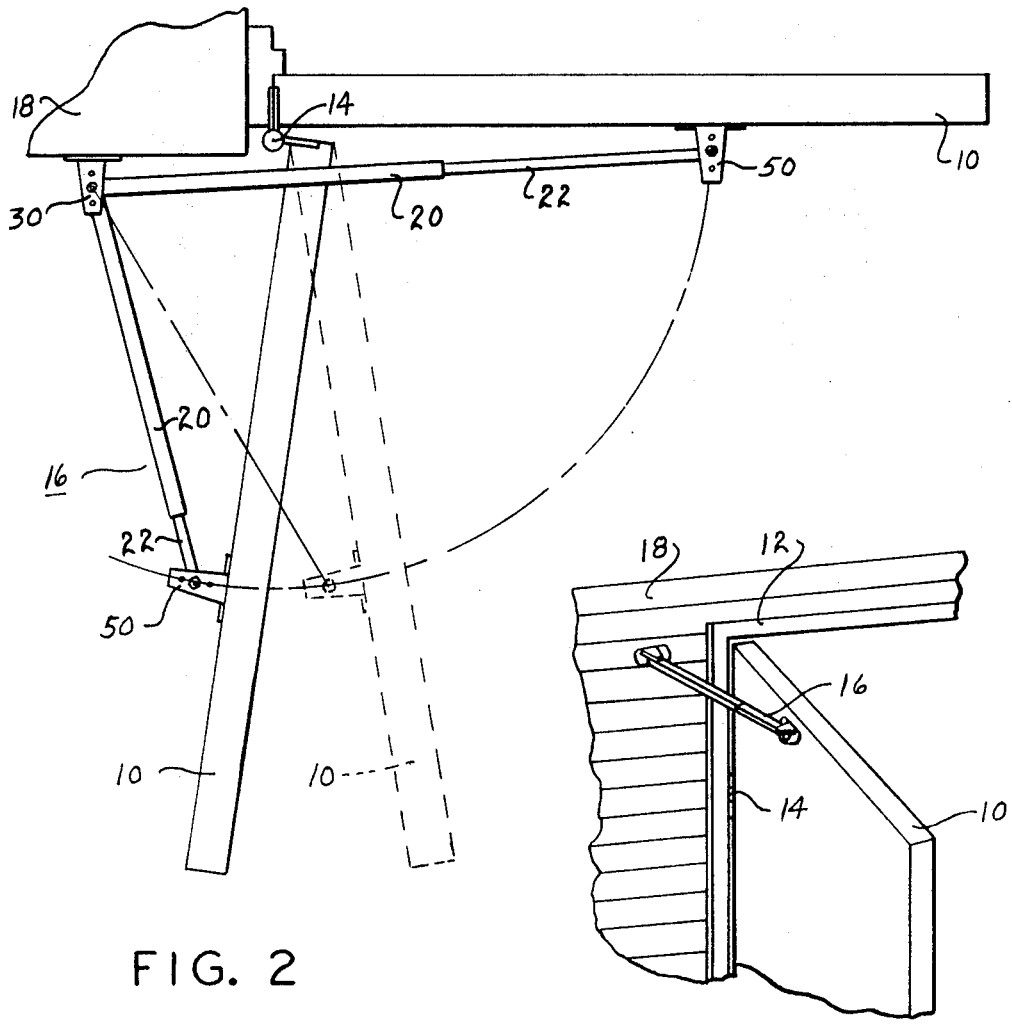
FIG. 2
FIG. 1
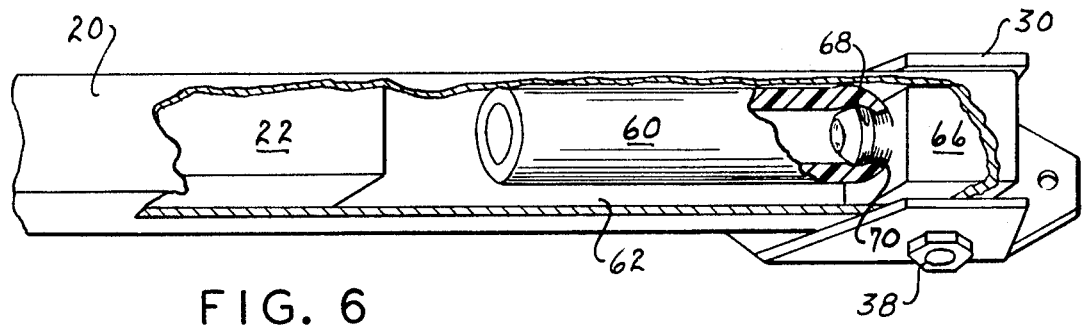
FIG. 6
INVENTOR.
JAMES R. JOHNSTON
BY Hobbs & Green
ATTORNEYS

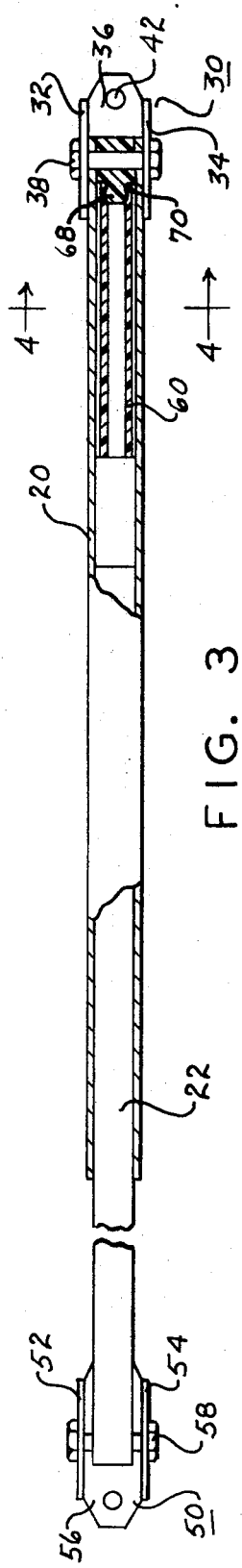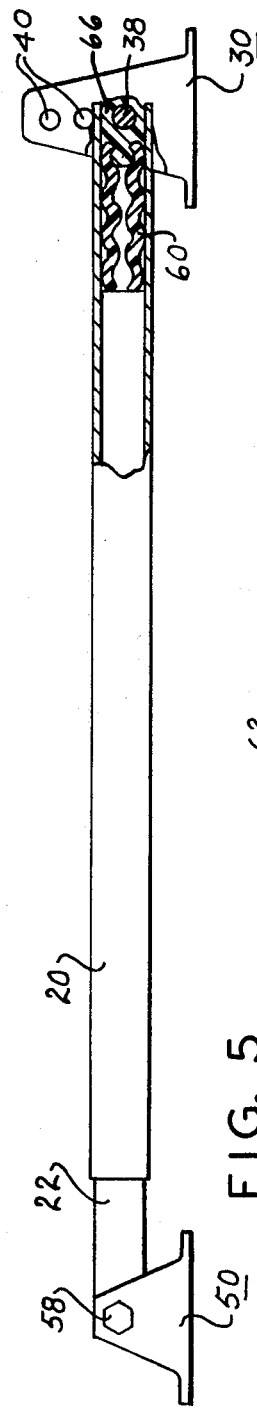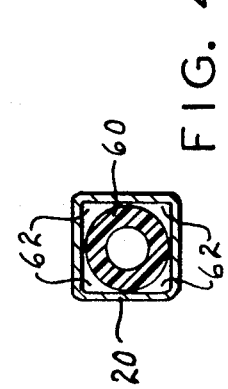

SHOCK ABSORBER

The conventional door shock absorber generally consists of some type of metal spring construction in which the spring is compressed by movement of the door to wide open position. In these devices, the spring is often compressed sharply by the sudden opening of the door by the wind, which may apply a very substantial force to the door and hence to the spring operated shock absorber. This sudden opening of the door and consequent operation of the shock absorber causes pronounced bounce-back, which can readily cause substantial damage to the door or door facing, and create a substantial strain on the shock absorber and the mounting fixtures therefor. Various types of force dampening means have been incorporated in the devices in the past to minimize excess bounce-back of the door and to prevent undue shock to the door structure and shock absorber installation. However, these force reducing means have often been expensive, complicated and unreliable, and easily broken. Further, they have been difficult to maintain in optimum operating condition and proper adjustment, and difficult to service and repair to eliminate excessive noise from metal-to-metal contact of the moving parts. Some of the foregoing difficulties have been the result of the coil spring in the conventional device becoming fully compressed by the sudden action of the door, thus forming a solid stop and thereafter suddenly exerting a rapid rebound force, the effects of which may be compounded by diminishing, but pronounced reciprocating or oscillating forces. These difficulties are often further accentuated by relatively short operating levers between the spring and door which result in a leverage arrangement favoring the destructive forces. It is therefore one of the principal objects of the present invention to provide a shock absorber device having an effective force absorbing capacity substantially greater than the conventional shock absorbers of comparable size, and being free of any substantial bounce-back even under excessive wind blown door gyrations.

Another object of the invention is to provide a shock absorber which effectively and yieldably absorbs substantial and sudden forces applied thereto, without the use of springs or fluid cylinders, and which cushions the applied forces to minimize strain on the door or other body controlled thereby.

Still another object of the invention is to provide a shock absorber of the aforesaid type in which the component parts are subjected principally to compression loading, thus permitting an efficient, durable and compact structure, and which can easily be designed to provide the optimum leverage characteristics for any particular type of installation.

Additional objects and advantages of the invention will become apparent from the following description and accompanying drawings, wherein:

FIG. 1 is a fragmentary perspective view of a door and door frame with the present shock absorber device being shown mounted thereon;

FIG. 2 is an enlarged top plan view of the door and shock absorber device shown in FIG. 1;

FIG. 3 is an enlarged partial elevational and cross sectional view of the present shock absorber device;

FIG. 4 is a cross-sectional view taken on line 4—4 of FIG. 3;

FIG. 5 is a top plan view of the present device showing the device in an operating position different from that illustrated in FIG. 3; and FIG. 6 is a cutaway perspective view of a portion of the present shock absorber device.

Referring more specifically to the drawings, numeral 10 designates generally a conventional door, 12 the door facing on which the door is mounted by two or more hinges 14, and numeral 16 indicates generally the present shock absorber device secured at one end to door 10 and at the other end to wall 18 surrounding the door facing 12. The device is designed to stop the swinging of the door primarily toward the opening direction and to cushion the movement to avoid an abrupt stop which might cause damage to the door or door frame or to the device itself. The device may be used on a variety of different types of installations in addition to doors, and may be placed at various locations on door installations to obtain optimum operation of the device.

The present shock absorber device as illustrated in the drawings consists of an outer tubular member 20 and an inner shaft means or plunger 22 which reciprocates in tubular member 20. As shown in the drawings, the tubular member is rectangular in cross section and is preferably formed of an extruded seamless metal member which will permit the smooth reciprocation of plunger 22 therein. While the tubular member 20 is shown as rectangular in cross-sectional shape, it may be round if desired. The tubular member is connected to the door or wall structure by a fixture 30 having two arms 32 and 34 connected integrally to base 36. A bolt 38 extends through holes in the two arms and through holes in the adjacent side of tubular member 20 which is pivotally mounted on the bolt to swing freely thereon during the operation of the device. As seen in FIG. 5, a series of holes 40 for bolt 38 is provided to permit adjustment of the arm with respect to the supporting wall and door structure for any particular installation. Fixture 30 contains a pair of holes 42 for securing the fixture to the supporting structure.

Shaft or plunger 22 is connected to the door or wall structure by a fixture 50 consisting of arms 52 and 54 joined integrally to base 56. The fixture 50 shown in the drawings is provided with a hole through each of the two arms for receiving a bolt 58 which extends through a hole in the adjacent end of plunger 22 for pivotally mounting the plunger on the fixture for free swinging movement thereon. While plunger 22 may be made of different materials, it is preferably constructed of a solid member of plastic, such as rigid vinyl, and is of substantially the same size and shape as the internal size and shape of tubular member 20, consistent with easy movement therein.

Mounted in the inner end of tubular member 20 is an elastomeric cushion 60, preferably of yieldable plastic, on which the inner end of plunger 22 seats when the door, for example, approaches its wide open position. As shown in the drawings, the cushion consists of a tubular member of a diameter preferably smaller than the right angle dimensions of the tubular member 20. As the shaft approaches its innermost position and engages the cushion, it compresses the cushion in the manner illustrated in FIG. 5, the cushion becoming distorted and expanded laterally, filling the surrounding corner areas 62 in the tubular member. The side walls of the cushion also may be forced inwardly in the manner illustrated in FIG. 5. The compacting of the material of the cushion into the corners minimizes spring-back and assists in avoiding an abrupt stop. The cross-sectional square shape of member 20 and the cylindrical shape of the cushion provide effective corner areas 62 for the aforementioned compacting of the cushion in the inner end of member 20. The cushion is seated on an end member 66 rigidly secured in the end of tubular member 20 and held therein by bolt 38 extending through the sidewalls of the tubular member and through a hole in the end member. In order to hold the cushion in place in the inner end of the tubular member, a boss 68 is formed on end member 66 for seating in the end of the tubular configuration of the cushion. The side walls of the cushion seat in a groove 70 at the base of the boss, thus retaining the cushion firmly in place. The cushion may be made of a number of different materials and be of various shapes; however, it is preferably made of polyurethane formed as a cylindrical member with or without the center hole shown in the drawings. This material provides a soft cushioning effect without causing any substantial bounce-back, and imparts a quiet, smooth opening operation to the door, and provides a long life to the cushion.

In the operation of the present shock absorbing device with the device installed on a door in the manner illustrated in FIGS. 1 and 2, the tubular member 20 and plunger 22 are attached to the wall and door by fixtures 30 and 50, respectively, and the tubular member and plunger are positioned relatively close to the surface of the door and wall. Upon opening the door, the plunger travels further inwardly into the tubular member, and if the door is opened to its substantially wide open position, the inner end of the plunger engages plastic cushion 60, compressing the cushion in the manner illustrated in the drawings and as previously described herein. In the normal operation of the door, the cushion yields sufficiently to prevent sudden stop of the plunger and hence prevents abrupt stop in the opening movement, as well as preventing crashing of the door into the adjacent wall. In the event a gust of wind catches the door as it is opened and swings the door suddenly to wide open position, the end of plunger 22 rapidly compresses the cushion further into the end of tubular member 20, however absorbing the shock without causing any rapid spring-back to afford an effective soft and momentary dead stop. The cushion will then gradually be returned to its original position and shape.

While only one embodiment of the present shock absorber device has been described in detail herein, various changes and modifications may be made without departing from the scope of the invention.

I claim:

1. A shock absorber device having an extended position and a depressed position, comprising a tubular member, a fixture pivotally secured to one end of said member for attaching said member to a supporting structure, an elastomeric cushion seated in said tubular member near the end to which said fixture is secured, a freely moving plunger extending into said tubular member through the end of said tubular member opposite said fixture and being spaced from said cushion when the device is in its extended position and movable to a position engaging and compressing said cushion when the device is in its depressed position, and a fixture pivotally secured to the end of said plunger projecting from said tubular member for attaching said plunger to a supporting structure.

2. A shock absorber device as defined in claim 1 in which said tubular member is rectangular in cross section.

3. A shock absorber device as defined in claim 1 in which said cushion is in the shape of a round tubular member.

4. A shock absorber device as defined in claim 3 in which said tubular member is rectangular in cross section.

5. A shock absorber device as defined in claim 1 in which said plunger is constructed of a relatively rigid plastic material.

6. A shock absorber device as defined in claim 3 in which an end member is disposed in said tubular member adjacent the fixture therefor and a means is attached to said end member and connected to said cushion for holding said cushion in the respective end of said tubular member.

7. A shock absorber device as defined in claim 1 in which said cushion is constructed of polyurethane.

8. A shock absorber device as defined in claim 3 in which said cushion is constructed of polyurethane.

9. A shock absorber device as defined in claim 4 in which said cushion is in the shape of a round tubular member of plastic elastomeric material.

10. A shock absorber device as defined in claim 4 in which said cushion is in the shape of a round tubular member of polyurethane.